US010812559B2

(12) United States Patent
Forman et al.

(10) Patent No.: US 10,812,559 B2
(45) Date of Patent: Oct. 20, 2020

(54) JUST-IN-TIME VARIABLE ADAPTIVE ENCODING AND DELIVERY OF MEDIA CONTENT

(71) Applicant: Amazon Technologies, Inc., Seattle, WA (US)

(72) Inventors: Benjamin Forman, Hertfordshire (GB); Joseph Michael Pavey, Issaquah, WA (US); Bobby Castleberry, Seattle, WA (US); Ravindra Ganti, Sammamish, WA (US); Stephen Han, Seattle, WA (US); Euan McLeod, Columbia, MO (US); Gaurav Saxena, Seattle, WA (US); Nathaniel Stewart, Seattle, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 15/409,231

(22) Filed: Jan. 18, 2017

(65) Prior Publication Data

US 2018/0205778 A1    Jul. 19, 2018

(51) Int. Cl.
*H04L 29/06*    (2006.01)
*H04L 12/26*    (2006.01)
*H04L 12/911*    (2013.01)
*H04N 21/24*    (2011.01)
*H04N 21/2343*    (2011.01)
*H04N 21/845*    (2011.01)
*H04N 21/643*    (2011.01)
*H04N 21/6377*    (2011.01)

(52) U.S. Cl.
CPC ........ *H04L 65/607* (2013.01); *H04L 43/0894* (2013.01); *H04L 47/822* (2013.01); *H04L 65/4084* (2013.01); *H04L 65/608* (2013.01); *H04N 21/2343* (2013.01); *H04N 21/2402* (2013.01); *H04N 21/6377* (2013.01); *H04N 21/64322* (2013.01); *H04N 21/8456* (2013.01)

(58) Field of Classification Search
CPC .. H04L 65/607; H04L 43/0894; H04L 47/822
USPC ...................................................... 709/231
See application file for complete search history.

(56) References Cited

U.S. PATENT DOCUMENTS

| 8,990,351 | B2* | 3/2015 | Isaksson | H04L 47/2416 |
| | | | | 709/219 |
| 9,344,748 | B2* | 5/2016 | Lam | H04N 21/2368 |
| 9,516,085 | B2* | 12/2016 | McCarthy | H04N 21/8456 |
| 9,769,235 | B2* | 9/2017 | Schmidt | H04L 65/4069 |

(Continued)

OTHER PUBLICATIONS

PCT International Search Report and Written Opinion dated Mar. 5, 2018 issued in PCT/US2017/065751.

(Continued)

*Primary Examiner* — Kevin T Bates
*Assistant Examiner* — Nazia Naoreen
(74) *Attorney, Agent, or Firm* — Weaver Austin Villeneuve & Sampson LLP

(57) ABSTRACT

Techniques are described for just-in-time variable adaptive encoding and delivery of media content. Fragments of media content are encoded at bitrates corresponding to available bandwidth of client devices. If the available bandwidth changes, the bitrate at which fragments are being encoded is adjusted to correspond with the changed bandwidth.

20 Claims, 4 Drawing Sheets

(56) References Cited

U.S. PATENT DOCUMENTS

| | | |
|---|---|---|
| 10,313,710 B1* | 6/2019 | Karlsson .............. H04N 21/234 |
| 2013/0044801 A1 | 2/2013 | Cote |
| 2014/0013376 A1 | 1/2014 | Xu et al. |
| 2015/0146778 A1 | 5/2015 | De Cicco et al. |
| 2015/0381690 A1 | 12/2015 | Schmidt et al. |
| 2016/0044080 A1* | 2/2016 | DuBreuil ........... H04N 21/6405 |
| | | 709/219 |
| 2016/0337680 A1* | 11/2016 | Kalagi .................. H04L 65/602 |
| 2017/0048536 A1* | 2/2017 | Forehand ........... H04N 21/2404 |
| 2017/0171264 A1* | 6/2017 | Salomons ........... H04L 65/4069 |
| 2018/0131975 A1* | 5/2018 | Badawiyeh .......... H04N 21/222 |

OTHER PUBLICATIONS

Chang, et al., "Efficient segment-based video transcoding proxy for mobile multimedia services" *Journal of Systems Architecture* 53:833-845, 2007.

* cited by examiner

JUST-IN-TIME VARIABLE ADAPTIVE ENCODING AND DELIVERY OF MEDIA CONTENT

BACKGROUND

A variety of media content streaming techniques are employed to deliver media content to client devices. As part of delivering media content, system administrators manually configure encoding profiles of media content at different bitrates in an attempt to balance the bitrate and resolution at which media content is reliably played back under different network conditions. In the context of satellite broadcast of media content, multiplexing techniques are used to encode many channels as a single media content transport stream (a multiplex) for delivery over cable, satellite, or terrestrial networks. A multiplex has a fixed size governed by computing resources of distribution devices, e.g., satellite transponders. As such, in order to fit multiple individual channel transport streams into a multiplex, the devices transcoding the channels vary the bit rates using statistical multiplexing techniques. Bits are allocated appropriately (e.g., more or less bits for a channel according to complexity) to a given Group of Pictures in a way that is not noticed by a viewer. In the context of internet-based media content, the media content is encoded at defined bitrate levels that are more or less constant and do not vary significantly after an initial set up. Media content is encoded at an encoding platform and then sent to a distinct set of delivery components known as a content delivery network (CDN). CDNs facilitate distribution of encoded media content through a variety of software, hardware, and network components to client devices according to geographic proximity. Client devices can stream media content received from a CDN using adaptive bitrate streaming, which allows the client devices to adjust the quality and/or bitrate of the media content requested to account for changes in network conditions. These techniques may be better illustrated using FIG. 1.

In the example of FIG. 1, a distributed content delivery service 100 includes multiple CDNs 101-104 located on the east and west coasts of the United States. CDNs may be regional or deployed worldwide. Origin servers 105-108 receive broadcast media content from broadcast content source 110 and provide the received broadcast media content to edge servers 111-115 for delivery to client devices 120-129.

Broadcast content source 110 includes media content transmitted via satellite. Satellite media content transmitted in this manner is often transmitted using a single fixed bandwidth transponder uplink for a set of channels. The channels are encoded to reduce or remove redundant information for delivery using a single multiplex (as mentioned above). Feedback loops between encoders and multiplexing devices dynamically adjust bandwidth allocation according to the complexity of the media content on the various channels. For example, a more complex channel (e.g., a sports game) might be allocated a greater amount of computing resources than a less complex channel (e.g., a news program).

CDNs 101-104 facilitate delivery of both live media content and video on demand (VOD) media content to client devices. Origin servers 105-108 function as entry points for distribution of media content throughout the rest of a CDN. For example, media content may be pushed to origin servers 105-108 (e.g., a device outside of the CDN pushes VOD media content to an origin server using FTP protocol) or pulled by origin servers 105-108 (e.g., if an origin server receives a request for media content that it does not have locally stored, the origin server can pull, or retrieve, content from a media content source). Using media content from broadcast content source 110, origin servers 105-108 can generate manifest files, package media content, and deliver both to edge servers 111-115.

Edge servers 111-115 communicate with client devices 120-129 for delivery of media content. Edge servers 111-115 can cache recently requested fragments of media content encoded at different bitrates and/or quality levels, and edge servers 111-115 can contact origin servers 105-108 to request fragments that are not in their respective caches if those fragments are requested by client devices 120-129. In some cases, a number of intermediary servers between origin servers 105-108 and edge servers 111-115 also provide intermediate levels of caching and other functionality of either one or both of the origin servers and the edge servers. Client devices 120-129 and edge servers 111-115 can communicate through different types of network protocols. For example, client device 120 may communicate with edge server 111 using a stateful connection, for instance, a physical socket connection between edge server 111 and client device 120. Examples of stateful network protocols include Real-Time Messaging Protocol (RTMP), Real-Time Messaging Protocol Encrypted (RTMPE), Multimedia Messaging Service (MMS), etc. In another example, client device 122 communicates with edge server 112 using a stateless connection, for instance, using the Hypertext Transfer Protocol (HTTP) along with manifest files to deliver media content. Client device 122 uses a manifest file to identify fragments of media content and request playback of them at a reliable bitrate using adaptive bitrate streaming.

Adaptive bitrate streaming is often employed for playback of media content on a client device. Adaptive bitrate streaming includes determining the client device's bandwidth and hardware resources (e.g., available central processing unit (CPU) capacity) in near real-time, adjusting the bitrate of the media content that is requested from a media server, and played back on the client device to account for changes in the bandwidth and hardware resources. Media content is divided into an ordered sequence of fragments. Each fragment is encoded at a variety of manually configured resolutions and bitrates (e.g., 848×480 at 1,600 kbps, 1280×720 at 2,500 kbps, 1920×1080 at 5,600 kbps, etc.). As mentioned above, client devices request fragments according to a manifest file identifying the next fragment to be requested and selecting a bitrate adapted to network conditions of the client device. Unfortunately, client devices often are streaming media content with bandwidth conditions that do not precisely match one of the manually configured bitrates in the manifest.

DETAILED DESCRIPTION

This disclosure describes techniques for implementing just-in-time variable adaptive encoding and delivery of media content, allowing for improved playback of media content (e.g., movies, television shows, videos, music, etc.) on client devices. The techniques enabled by the present disclosure represent a significant departure from conventional techniques that are prone to mismatching fragments at imprecise bitrates in relation to a specific client device's available bandwidth. When a client device requests playback of media content from a media server, the media server can encode a first fragment of media content at a bitrate based on the available bandwidth of the client device and deliver the fragment directly to the client device. In some cases, when the client device requests playback of the next portion of media content and the client device's available bandwidth decreases, the media server can encode the next fragment at a bitrate lower than the previous fragment. In other cases, when the client device requests playback of the next portion of media content and the client device's available bandwidth has increased, the media server can encode the next fragment at a higher bitrate than the previously delivered fragment. Using this approach, fragments can be encoded more precisely at bitrates that provide a higher quality and more reliable playback experience on a client device. An example may be instructive.

Figure 2:
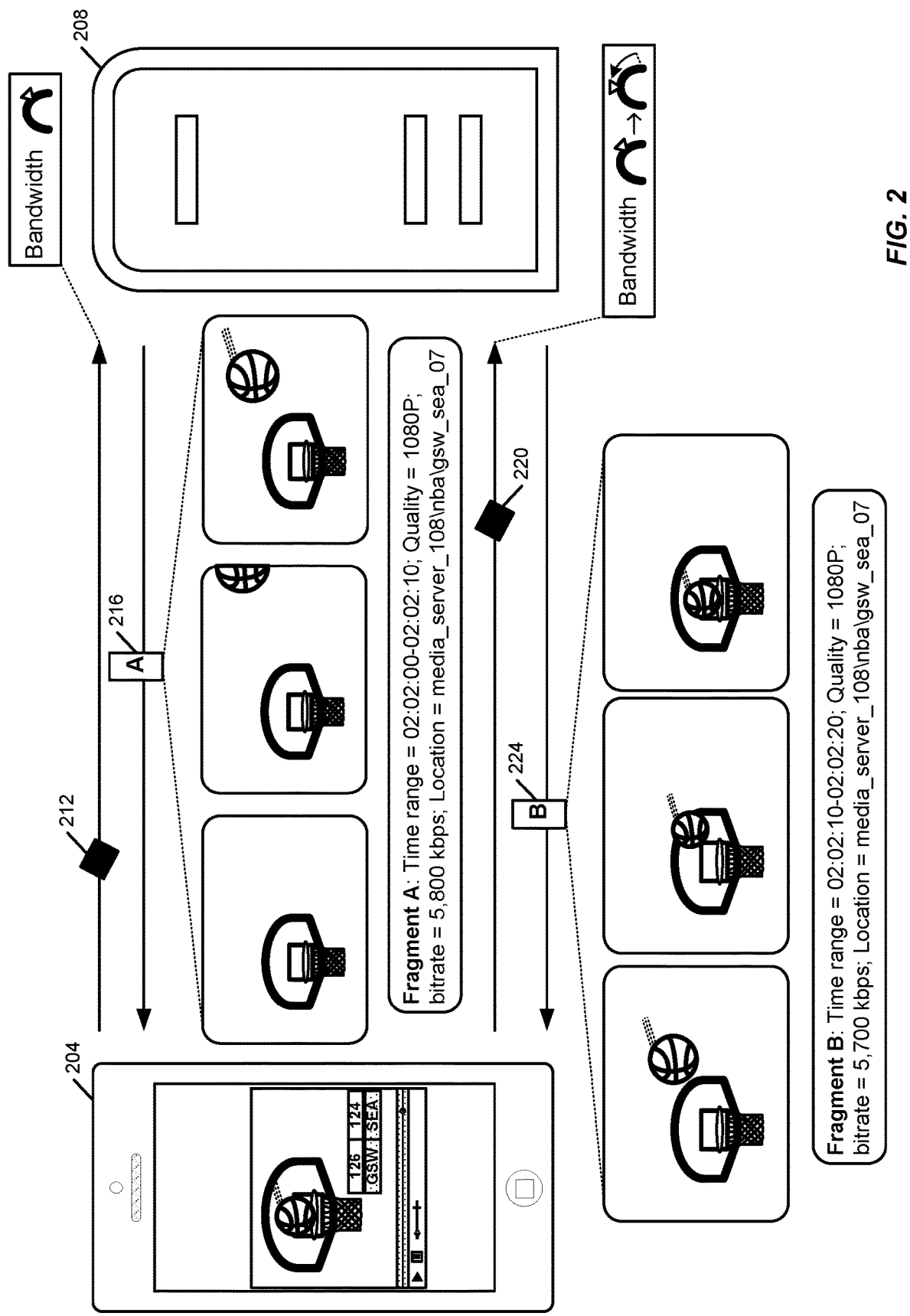
FIG. 2 illustrates an example of just-in-time variable adaptive encoding and delivery of media content.

In more detail, FIG. 2 illustrates an example of just-in-time variable adaptive encoding and delivery of media content. As shown in FIG. 2, client device 204 is an electronic device, such as a smartphone, that can be used to stream media content for playback on a display. Client device 204 requests media content from media server 208. For example, client device 204 requests playback of media content (e.g., an archived NBA basketball game between the Golden State Warriors and the Seattle Supersonics from 2007) by providing a request 212 to media server 208. Request 212 includes metadata that allows media server 208 to generate properly encoded fragments for playback on client device 204. After media server 208 receives request 212, media server 208 determines an available bandwidth of client device 204. For example, media server 208 determines that client device 204 has adequate bandwidth to reliably stream media content at a bitrate of 5,800 kbps. After determining the available bandwidth, media server 208 encodes fragment 216. Fragment 216 is encoded in near real-time using source media content at a bitrate corresponding to the available bandwidth of client device 204. Encoded fragment 216 corresponds to the portion of media content requested in request 212 (e.g., a time range of 02:02:00-02:02:10). Next, media server 208 sends fragment 216 to client device 204. Client device 204 might store fragment 216 in a playback buffer, which stores the most recent fragments of media content for playback (e.g., any number of seconds or minutes of media content). Continuous playback of media content can be enabled through a sequence of fragments stored in the playback buffer. As client device 204 plays fragments, fragments are removed from the playback buffer, and new requests (e.g., request 220) for playback of media content are sent to media server 208.

Figure 1:
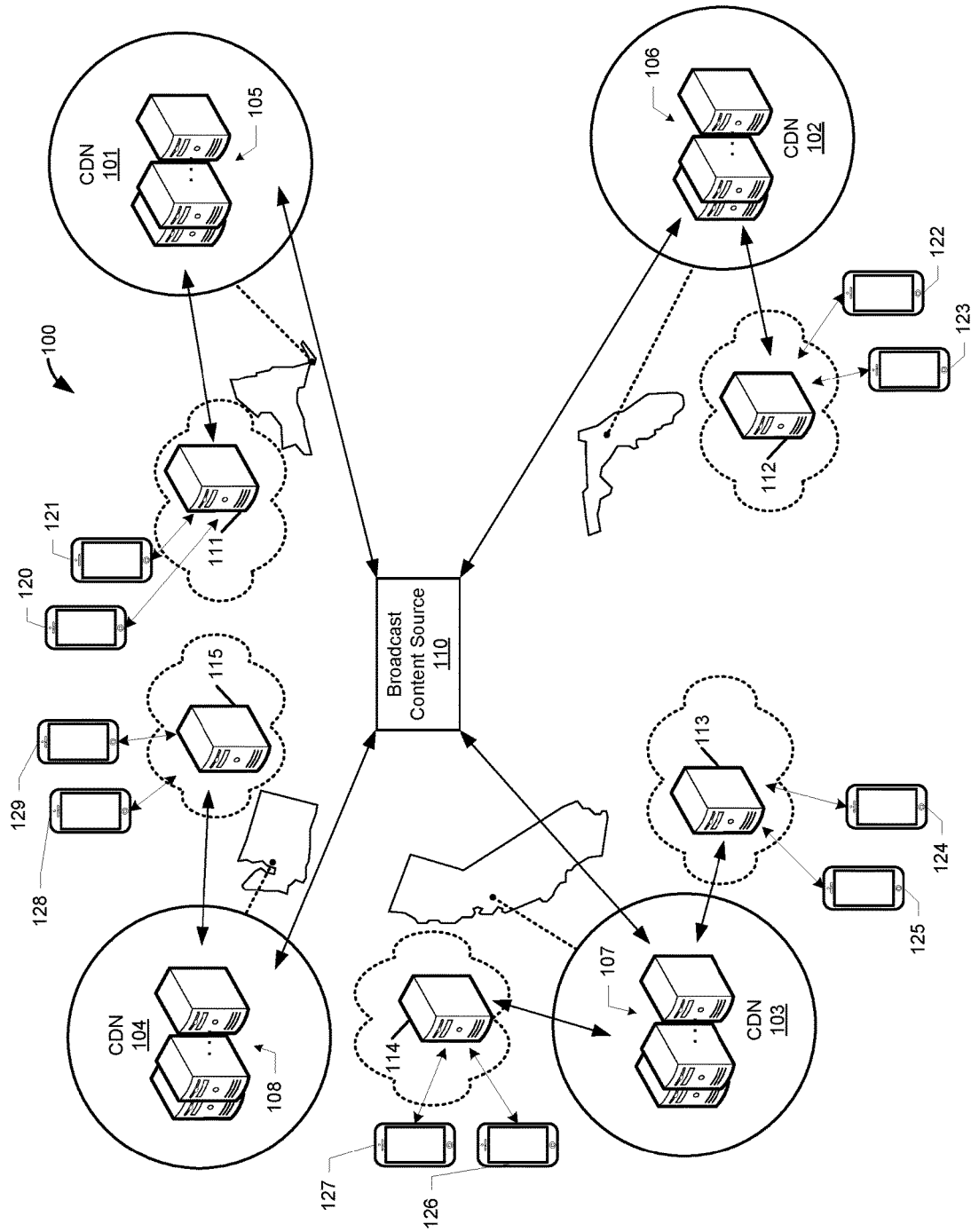
FIG. 1 illustrates an example of a system delivering media content.

Media server 208 can continuously monitor available bandwidth and adjust the bitrate to encode new fragments. As each new request for playback (e.g., request 220) is received by media server 208, the available bandwidth of client device 204 can be determined. In the example of FIG. 1, media server 208 determines that the amount of available bandwidth has decreased. As such, media server 208 encodes fragment 224 at a lower bitrate than fragment 216. By providing fragments customized to streaming conditions of particular client devices, playback of media content can be streamed more reliably at a better quality level.

Figure 3:
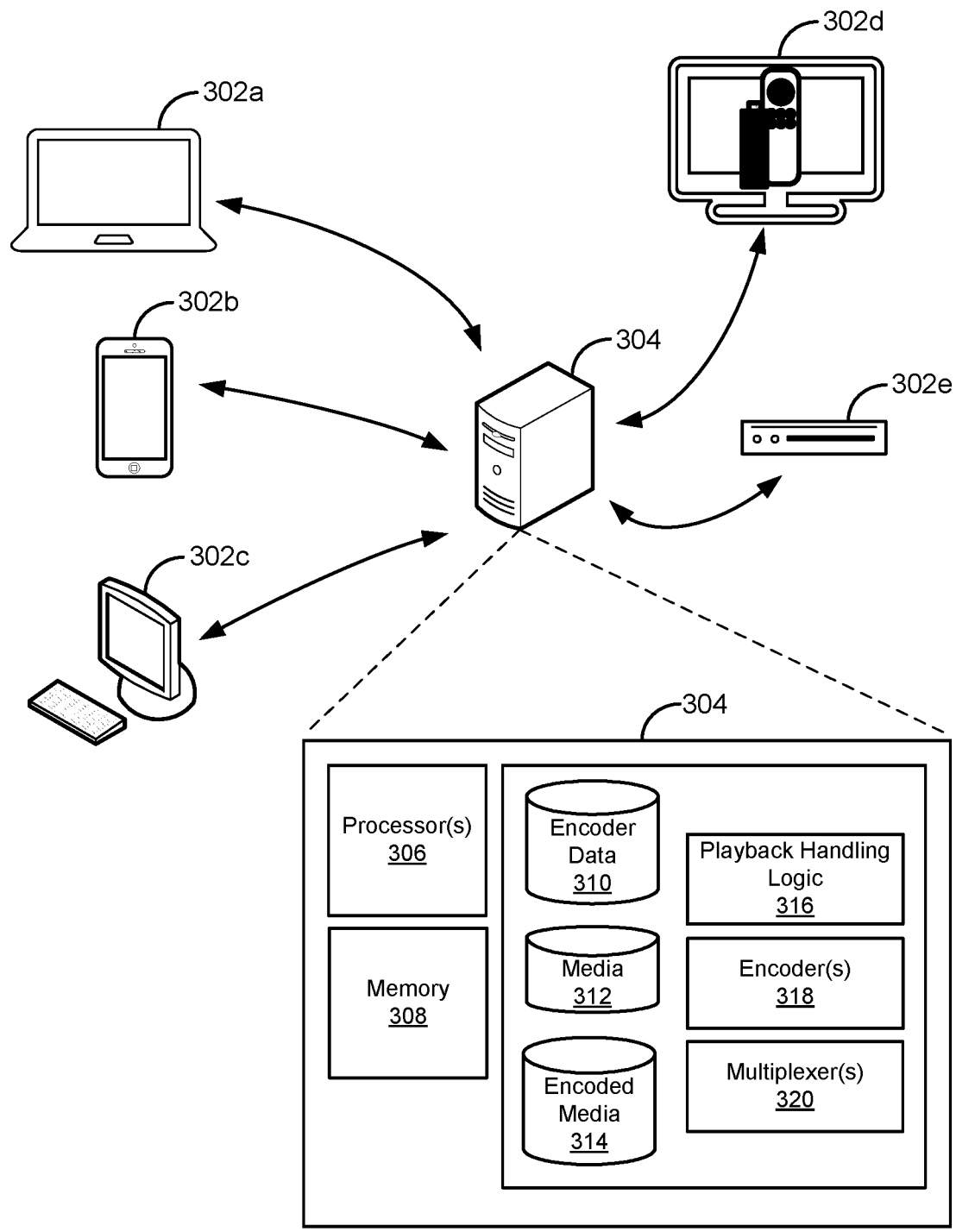
FIG. 3 illustrates an example of a computing environment using just-in-time variable adaptive encoding and delivery of media content.

FIG. 3 illustrates an example of a computing environment using just-in-time variable adaptive encoding and delivery of media content. The computing environment of FIG. 3 includes media server 304 that encodes and provides media content to client devices 302a-e. Client devices 302a-e decodes the encoded media content for playback on a display screen.

In FIG. 3, client device 302a is a laptop computer, client device 302b is a smartphone device, client device 302c is a desktop computer, client device 302d is a television and media player stick (e.g., Amazon Fire TV Stick®), and client device 302e is a set-top box. In addition, related functionality may also be implemented within tablets, wearable devices, virtual or augmented reality headsets, video game consoles, etc.

Media server 304 can conform to any of a wide variety of architectures, and its functionality may be implemented by a variety of physical servers and/or virtual servers. For example, media server 304 may be partitioned to have separate virtual servers configured to perform different functions. For example, one virtual server might encode media content, and a second virtual server might provide the encoded media to client devices 302a-e. The functionality and components of media server 304 might be one of many other servers deployed throughout various geographic locations (e.g., across different countries, states, cities, etc.) using a network such as any subset or combination of a wide variety of network environments including, for example, IP-based networks, telecommunications networks, wireless networks, cable networks, public networks, private networks, wide area networks, local area networks, the Internet, the World Wide Web, intranets, extranets, etc.

In FIG. 3, media server 304 includes various types of logic to encode and deliver requested media content. For example, media server 304 includes playback handling logic 316 to provide proper playback of fragments and playback metadata to client devices 302a-e. Encoder component 318 encodes media content based on source media content stored in source media content database 312. After an encoding process, encoded media content (e.g., fragments) is stored in memory such as a local buffer for live media content or encoded media content database 314. Encoder component 318 use encoding parameters and/or available client device bandwidth from encoder data 310 to encode fragments of media content at various bitrates. For example, client device 302a might be receiving fragments encoded at a bitrate of 3,200 kbps, and client device 302b might be receiving fragments encoded at a bitrate of 2,400 kbps. Encoder component 318 might use a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.). Multiplexer 320 might be implemented using either or both software and hardware components. Multiplexer 320 can include statistical multiplexing logic configured to allocate computing resources of media server 304 among several variable bitrate encoding processes, e.g., allocating more computing resources for fragments being encoded at higher bitrates and allocating less computing resources for fragments being encoded at lower bitrates.

Media server 304 can include one or more processor circuits 306, memory 308, and other hardware components to encode media content and provide the encoded media content to client devices 302a-e. For example, processor circuits 306 execute stored instructions in memory 308 of media server 304 to implement encoding techniques disclosed herein. It should be noted that, while processor circuits 306, memory 308, encoder data 310, database 312, database 314, logic 316, encoder component 318, multiplexer 320 are contemplated as integrated with media server 304, implementations are contemplated in which some or all of their respective functionality is implemented independently of a single media server 304.

Client devices 302*a-e* can also include various types of logic, for instance, decoder logic for decoding the encoded media content received from media server 304 and playback handling logic to request playback of portions of media content. In addition, client devices 302*a-e* includes various types of memory to store and/or cache decoded media, one or more processors, and other hardware components to request and decode the encoded media content provided by media server 304. For example, the processors of client devices 302*a-e* execute stored instructions in memory to implement decoding techniques based on the encoding techniques disclosed herein.

It should be noted that, despite references to particular computing paradigms and software tools herein, the computer program product and the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 4:
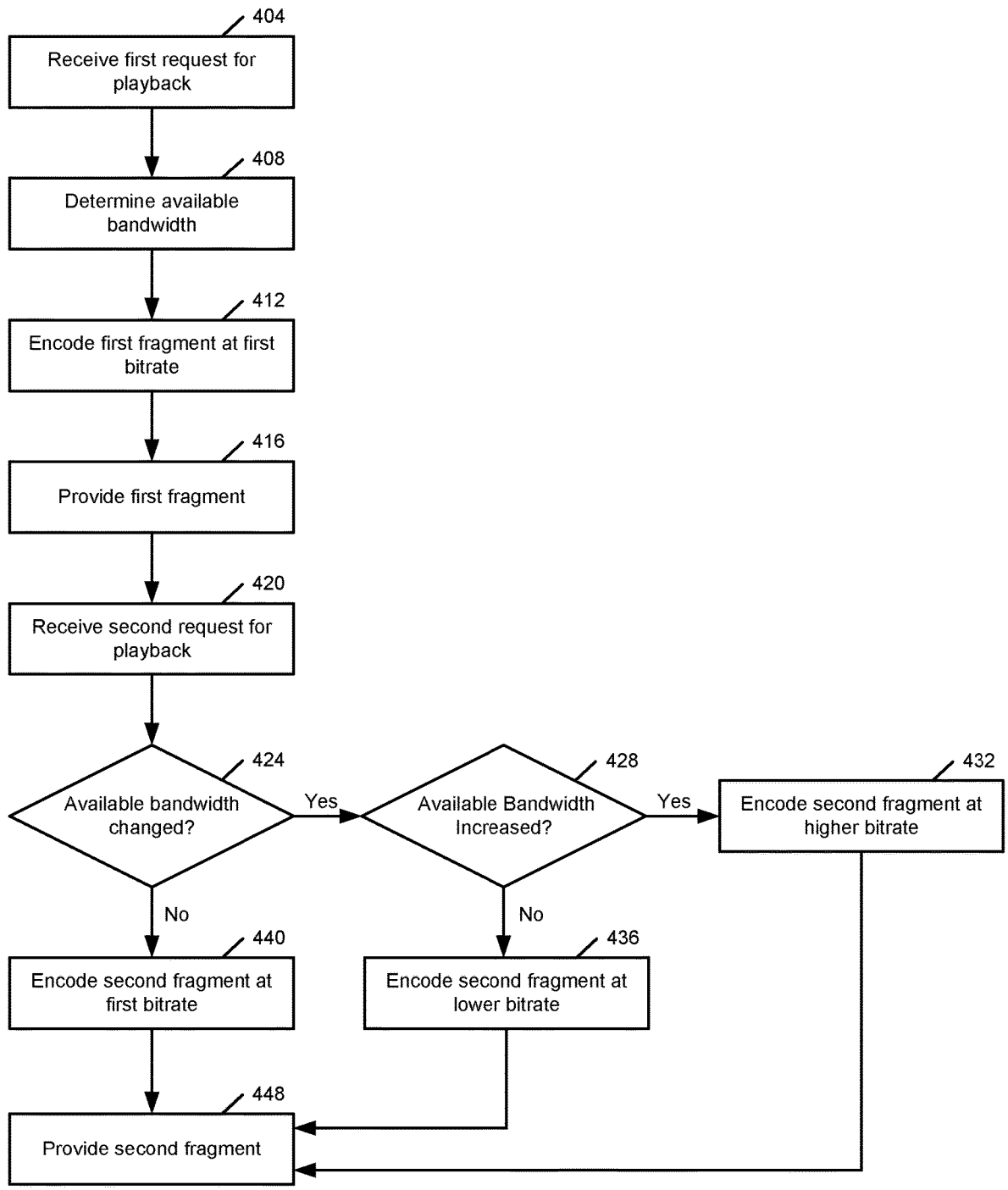
FIG. 4 is a flowchart illustrating just-in-time variable adaptive encoding and delivery of media content.

A specific implementation will now be described with reference to FIG. 2, the computing environment of FIG. 3, and the flow diagram of FIG. 4. In FIG. 4, a client device (e.g., client device 204) requests media content, for example, by selecting an archived or live NBA game for playback from a video streaming service in a web browser or software program. Client device 204 sends the request, and media server 208 receives the request (404). The received request might include an identifier indicating the selected NBA game and a time range for the next portion of the media content (e.g., the first 10 seconds of the game). After sending an initial request to begin playback of media content, client device 204 periodically sends requests for additional portions of media content. For example, client device 204 might send an additional request for media content when a playback buffer of stored media content drops below a buffer threshold (e.g., 1-5 seconds of media content remaining in the playback buffer). In another example, client device 204 might send an additional request according to a time interval (e.g., every 5-10 seconds after sending a previous request). In one more example, client device 204 might send a request if additional bandwidth becomes available for playback of media content (e.g., an increase in downstream bandwidth from 5,000 kbps to 10,000 kbps).

Returning to FIG. 4, after receiving the request for playback of media content (404), the available bandwidth of client device 204 is determined (408). Available bandwidth of a client device can refer to the data transfer rate at which a client device can reliably receive and playback media content using a communication connection with a media server. For example, a client device might have an available bandwidth capable of reliably streaming media content at 5,800 kbps. However, the client device might have an internet connection with a capacity of 7,500 kbps of downstream bandwidth. The remaining portion of the client device's downstream bandwidth of might be affected by various network constraints (e.g., communication channel interference, wireless transmission interference, etc.) or other programs or services communicating with the client device through the internet (e.g., web browsing, downloading updates, etc.). Also or alternatively, a client device's available bandwidth might be affected by processes beyond the communication connection of the client device and media server (e.g., general congestion in a geographic area, ISP connectivity issues, congestion between intermediary servers, etc.).

Media server 208, client device 204, or a combination of both devices can determine available bandwidth. In some implementations, client device 204 provides an indication of its available bandwidth in request 212. For example, client device 204 estimates available bandwidth by determining the amount of time needed to download a particular amount of content, for instance, one or more data packets sent by media server 208, or any other related or unrelated downstream-based action by client device 204 (e.g., downloading a portion webpage prior to selecting media content for playback). The estimated available bandwidth might be included with an initial request to start playback of media content. Similarly, media server 208 might estimate the available bandwidth of client device 204 based on the time it takes to receive additional requests for data packets after sending one or more previous data packets. In one implementation, the number of bits corresponding to the sent data packets might be divided by the download time, resulting in a bitrate that may then be provided as input to an encoder component. In another implementation, available bandwidth can be determined according to the rate that the first fragment was downloaded. The download rate represents a total number of bits associated with the first fragment in relation to an amount of time to download the first fragment (e.g., a 5 MB fragment downloaded in 20 seconds corresponds to a rate of 2 Mbps, a 5 MB fragment downloaded in 5 seconds corresponds to a rate of 8 Mbps, etc.). In one other implementation, media server 208 determines the available bandwidth of client device 204 upon receiving request 212 by processing the indication of available bandwidth as determined by client device 204 (as discussed above). In another implementation, media server 208 stores and maintains historical bandwidth availability data of client devices, which may have particular use with initial requests for playback. For example, media server 208 might have minutes, hours, days, months, etc. of historical bandwidth availability data associated with client device 204. As such, media server 208 estimates the available bandwidth of client device 204 using the historical data (e.g., client device 204 averages an available bandwidth of 5,000 kbps when streaming at 5:00 PM PST). In another example, bandwidth availability data is used to determine available bandwidth based on client device characteristics (e.g., device type (smartphone, desktop, etc.), communication type (Ethernet connection, cellular data network, type of ISP, etc.), or geographic location (devices located in the Temescal neighborhood of Oakland, Calif., Alameda County, Calif., etc.)). For example, a media server might estimate available bandwidth of a new client device in the Temescal neighborhood by using bandwidth availability data of other client devices that connected from the Temescal neighborhood.

In some implementations, the availability of computing resources (available bandwidth and available hardware resources, e.g., CPU capacity) of a media server is included as part of the determination of block 408. For example, media server 208 might handle many encoding processes from many client devices at a particular period of time. In addition, media server 208 has available resources that change according to the number of fragments being encoded and the complexity of each fragment. In one example, a media server is encoding and delivering media content at near-capacity to many client devices. As a new client device requests playback of a portion media content, the media server can determine whether it has the available resources to handle an encoding process for the requested portion of media content. As such, if the media sever determines that it has the available resources, it can balance the computing resource load of all of the encoding processes to accommodate encoding a new fragment. In another example, if client device 204 requests playback of media content from media server 208 has less resources available than the available bandwidth of client device 204, then the bitrate selected to encode the next fragment will be lower. For example, if client device 204 has an available bandwidth of 5,500 kbps, but media server 208 has an available bandwidth of 5,300 kbps and/or limited computing resources, then the determined available resources would indicate that the next fragment should be encoded at 5,300 kbps.

Returning to FIG. 4, a fragment is encoded according to the available bandwidth (408) at a bitrate capable of being reliably played back (412). Encoded fragments correspond to the portion of media content requested (404). For example, media server 208 might encode a fragment corresponding to a time range indicating "02:02:00-02:02:10." In addition to the available bandwidth of a client device, fragments are encoded using variable bitrate encoding techniques (discussed above) to reduce size and complexity of a fragment. In some implementations, media server 208 uses statistical multiplexing techniques to dynamically adjust allocation of encoding bandwidth according to the relative complexity of the fragments being encoded at that time. For example, a media server encoding a fragment of a basketball game typically needs more bandwidth to encode the fragment at a higher bitrate because of the complexity of the media content (e.g., there are a greater number of frame-to-frame pixel changes because of the movement occurring in the game). In contrast to the basketball game, a cartoon with a solid color background is typically less complex (e.g., fewer frame-to-frame pixel changes), which needs less bandwidth to encode fragments. However, if the basketball game transitions to a commercial and the cartoon transitions to an action scene with more frame-to-frame pixel changes than the commercial, then the bandwidth allocated to the next cartoon fragment is increased in relation to the fragment of the commercial. In some implementations, a media server executes multiple encoding processes. As such, the media server can configure separate encoder components to handle the encoding of different fragments. For example, one encoder component might handle the encoding to the basketball game, while another encoder component handles the encoding of the cartoon. Each encoder component can be configured to communicate their respective available resources to the other encoder components such that additional encoding processes may be transitioned from one encoder component to another (e.g., if a first encoder component is encoding less complex fragments it could begin handling additional encoding from another encoder component encoding at capacity). In addition, the total number of frame-to-frame pixel changes can be determined from encoder component processing workload and used for selecting a bitrate to encode fragments for a new client device.

In contrast to the conventional techniques described above, fragments are encoded by a media server in near real-time in response to requests from client devices. Media server 208 can encode fragments at various levels of granularity (e.g., in increments of 1 kbps, 5 kbps, 10 kbps, 100 kbps, etc.). In an example using conventional techniques, a first client device with an available bandwidth of 5,800 kbps requesting playback of the first 10 seconds of the first episode of The Grand Tour might receive a manifest indicating encoding options of a fragment encoded at 5,800 kbps, 3,000 kbps, 2,350 kbps, etc. As such, the client device selects the 5,800 kbps playback option for playback. However, another client device with an available bandwidth of 4,200 kbps requesting playback of the same media content would have to choose between either the less than desirable quality option (3,000 kbps) or the other option that might cause rebuffering events (5,800 kbps). In contrast to conventional techniques, using some of the disclosed techniques, when the first client device requests playback of the first 10 seconds of the first episode of The Grand Tour, a fragment is encoded at 5,800 kbps, while a fragment is encoded at 4,200 kbps for the other client device, resulting in a more reliable and higher quality playback experience.

Returning to FIG. 4, after encoding a fragment, the fragment is provided to the client device (416). Upon receiving the fragment, client device 204 begins playback of the fragment or adds the fragment to a play back buffer. In some implementations, the fragment includes metadata such as a time range of the fragment, a quality level of the fragment, a media server identifier, and a location of the fragment, previous fragment bitrates, a total amount of time for the media content, an identifier of the next fragment to encode, an encoder identifier, a title of the media content, etc. In some implementations, IPv6 addresses are used to identify fragments, i.e., each fragment is uniquely identified using the 128-bit address space of IPv6. In contrast to a traditional HTTP request, such a request reduces the information that needs to be specified in higher layers of the OSI or TCP/IP stack (e.g., the session, presentation, and/or application layers), which may reduce the overall size of the request and result in more efficient transmission to the client device.

As discussed above, additional requests for playback of portions of media content allow for uninterrupted playback (420). While receiving or after receiving the fragment, client device 204 sends a new request for the next portion of media content available for playback. In some implementations, additional requests include some or all of the metadata described above. For example, new requests might include the media server identifier provided in prior fragments such that a communication connection is reestablished with a previously used media server, allowing for more efficient transmission of new requests. Upon receiving the request, a change in bandwidth is determined (424). In some cases, available bandwidth of the client device increases (428), available bandwidth decreases (432), or available bandwidth remains approximately the same (440). In some implementations, one client device requests media content previously requested by another client device. The previously requested media content might result in a fragment encoded at a bitrate approximately the same as the available bandwidth of the more recent client device. For example, media server 208 determines that a fragment of media content for The Grand Tour is stored in a cache of the media server based on a previous request for playback. In addition, media server 208 identifies the bitrate of the fragment as being approximately the same as the available bandwidth of client device 204. The determination as to whether a particular fragment is encoded at approximately the same available bandwidth can vary according to desired specification (e.g., within a range of 10 kbps, 50 kbps, 100, kbps, etc.). As such, if a cached copy of a fragment exists, media server 208 will attempt to provide the cached fragment before encoding a new fragment. The manner in which a determination of approximate similarity occurs is not limited to this example and may also be implemented in a variety of other ways as understood by those skilled in the art.

After determining whether available bandwidth has changed (424), a fragment might be encoded at a higher bitrate (432), at a lower bitrate (436), or at approximately the same bitrate (440) as the previous determination (412). The encoded fragment can then be provided to the client device (448).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving a request from a first client device for a portion of first media content;
receiving a request from a second client device for a portion of second media content;
determining a complexity associated with the portion of the first media content;
determining a complexity associated with the portion of the second media content;
determining available bandwidth of the first client device;
determining available bandwidth of the second client device;
determining available resources of one or more media servers communicating with the first client device and the second client device;
selecting a first bitrate according to the available bandwidth of the first client device, the complexity associated with the portion of the first media content, the complexity associated with the portion of the second media content, and the available resources of the one or more media servers;
selecting a second bitrate according to the available bandwidth of the second client device, the complexity associated with the portion of the second media content, the complexity associated with the portion of the first media content, and the available resources of the one or more media servers; using a first encoder, encoding a first fragment corresponding to the portion of the first media content at the first bitrate;
determining available resources of a second encoder;
based on the available resources of the second encoder and using the second encoder, encoding a second fragment corresponding to the portion of second media content at the second bitrate;
providing the first fragment to the first client device;
providing the second fragment to the second client device
receiving an additional request for an additional portion of the first media content, the additional portion of the first media content being next in a playback sequence to the portion of the first media content;
determining an additional available bandwidth of the first client device; and
using the second encoder, encoding a third fragment corresponding to the additional portion of the first media content, the third fragment being encoded at a third bitrate based at least in part on the additional available bandwidth, the third bitrate being different from the first bitrate, thereby using two different encoders to encode successive portions of the first media content; and
providing the third fragment to the first client device.

2. The method of claim 1, further comprising determining further available resources of the one or more media servers, and wherein transitioning encoding of the third fragment to the second encoder is based on the further available computing resources of the one or more media servers.

3. The method of claim 1, wherein determining the available resources of the one or more media servers includes:
determining a complexity associated with a portion of third media content; and
determining a total complexity based on the complexity associated with the portion of the first media content, the complexity associated with the portion of the second media content, and the complexity associated with the portion of the third media content.

4. The method of claim 1, wherein the first fragment includes a time range of the first fragment, a quality level of the first fragment, a media server identifier, and a Uniform Resource Locator (URL) of the first fragment.

5. A system, comprising:
one or more processors and memory configured to:
receive a first request from a first client device for a first portion of media content;
determine a first available bandwidth of the first client device;
responsive to determination of the first available bandwidth of the first client device, and using a first encoder, encode a first fragment corresponding to the first portion of the media content, the first fragment being encoded at a first bitrate based at least in part on the first available bandwidth;
provide the first fragment to the first client device;
receive a second request from the first client device for a second portion of the media content, the second portion of the media content being next in a playback sequence to the first portion of the media content;
determine a second available bandwidth of the first client device, the second available bandwidth being different from the first available bandwidth;
responsive to determination of the second available bandwidth of the first client device and based on available resources of a second encoder, using the second encoder to encode a second fragment corresponding to the second portion of the media content, the second fragment being encoded at a second bitrate based at least in part on the second available bandwidth, the second bitrate being different from the first bitrate, thereby using two different encoders to encode successive portions of the media content; and provide the second fragment to the first client device.

6. The system of claim 5, wherein the one or more processors and memory are further configured to:
determine a complexity associated with the first fragment; and
determine a complexity associated with the second fragment, wherein the complexity of the second fragment is different than the complexity of the first fragment; and
wherein the one or more processors and memory are configured to encode the second fragment additionally responsive to the determination that the complexity associated with the second fragment is different than the complexity associated with the first fragment.

7. The system of claim 5, wherein the one or more processors and memory are further configured to:
receive a request from a second client device for the first portion of the media content;
determine available bandwidth of the second client device, the available bandwidth of the second client device being different from the first available bandwidth of the first client device; and
using a third encoder, encode a third fragment corresponding to the first portion of the media content, the third fragment being encoded at a third bitrate different from the first bitrate.

8. The system of claim 5, wherein the first encoder and the second encoder are associated with one or more media servers, and wherein the one or more processors and memory are further configured to transition encoding of the media content from the first encoder to the second encoder based on available computing resources of the one or more media servers.

9. The system of claim 5, wherein the one or more processors and memory are further configured to:
receive a third request from the first client device for a third portion of the media content;
receive a request from a second client device for playback of a fourth portion of the media content;
determine a complexity associated with the third portion of the media content;
determine a complexity associated with the fourth portion of the media content;
determine a third available bandwidth of the first client device;
determine available resources of one or more media servers; and
encode a third fragment corresponding to the third portion of the media content, the third fragment being encoded at a third bitrate based on the third available bandwidth, the complexity associated with the third portion of the media content, the complexity associated with the fourth portion of the media content, and the available resources of the one or more media servers.

10. The system of claim 5, wherein the first fragment includes a time range of the first fragment, a quality level of the first fragment, a media server identifier, and a URL of the first fragment, and wherein the second request for the second portion of the media content includes the media server identifier of the first fragment.

11. The system of claim 5, wherein the one or more processors and memory are configured to determine the first available bandwidth of the first client device using historical bandwidth availability data representing an average available bandwidth of a plurality of prior determinations of available bandwidth of the first client device.

12. The system of claim 5, wherein the one or more processors and memory are further configured to:
receive a third request from the first client device for a third portion of the media content;
determine a third available bandwidth of the first client device;
determine that a third fragment corresponding to the third portion of the media content is stored in a cache associated with one or more media servers, the third fragment being encoded at a third bitrate corresponding to the third available bandwidth, the third fragment being stored in the cache based on a previous request from a second device; and
provide the third fragment to the first client device.

13. A computer-implemented method, comprising:
receiving a first request from a first client device for a first portion of media content;
determining a first available bandwidth of the first client device;
responsive to determination of the first available bandwidth of the first client device, and using a first encoder, encoding a first fragment corresponding to the first portion of the media content, the first fragment being encoded at a first bitrate based at least in part on the first available bandwidth;
providing the first fragment to the first client device;
receiving a second request from the first client device for a second portion of the media content, the second portion of the media content being next in a playback sequence to the first portion of the media content;
determining a second available bandwidth of the first client device, the second available bandwidth being different from the first available bandwidth;
responsive to determination of the second available bandwidth of the first client device and based on available resources of a second encoder, using the second encoder to encode a second fragment corresponding to the second portion of the media content, the second fragment being encoded at a second bitrate based at least in part on the second available bandwidth, the second bitrate being different from the first bitrate, thereby using two different encoders to encode successive portions of the media content; and
providing the second fragment to the first client device.

14. The method of claim 13, further comprising:
determining a complexity associated with the first fragment; and
determining a complexity associated with the second fragment, wherein the complexity of the second fragment is different than the complexity of the first fragment; and
wherein encoding the second fragment is additionally responsive to determination that the complexity associated with the second fragment is different than the complexity associated with the first fragment.

15. The method of claim 13, further comprising:
receiving a request from a second client device for the first portion of the media content;
determining available bandwidth of the second client device, the available bandwidth of the second client device being different from the first available bandwidth of the first client device; and using a third encoder, encoding a third fragment corresponding to the first portion of the media content, the third fragment being encoded at a third bitrate different from the first bitrate.

16. The method of claim 13, wherein the first encoder and the second encoder are associated with one or more media servers, and wherein the method further comprises transitioning encoding of the media content from the first encoder to the second encoder based on available computing resources of the one or more media servers.

17. The method of claim 13, further comprising:
receiving a third request from the first client device for a third portion of the media content;
receiving a request from a second client device for playback of a fourth portion of the media content;
determining a complexity associated with the third portion of the media content;
determining a complexity associated with the fourth portion of the media content;
determining a third available bandwidth of the first client device;
determining available resources of one or more media servers; and
encoding a third fragment corresponding to the third portion of the media content, the third fragment being encoded at a third bitrate based on the third available bandwidth, the complexity associated with the third portion of the media content, the complexity associated with the fourth portion of the media content, and the available resources of the one or more media servers.

18. The method of claim 13, wherein the first fragment includes a time range of the first fragment, a quality level of the first fragment, a media server identifier, and a URL of the first fragment, and wherein the second request for the second portion of the media content includes the media server identifier of the first fragment.

19. The method of claim 13, wherein determining the first available bandwidth of the first client device includes using historical bandwidth availability data representing an average available bandwidth of a plurality of prior determinations of available bandwidth of the first client device.

20. The method of claim 13, further comprising:
receiving a third request from the first client device for a third portion of the media content;
determining a third available bandwidth of the first client device;
determining that a third fragment corresponding to the third portion of the media content is stored in a cache associated with one or more media servers, the third fragment being encoded at a third bitrate corresponding to the third available bandwidth, the third fragment being stored in the cache based on a previous request from a second device; and
providing the third fragment to the first client device.

* * * * *